Figure 1:
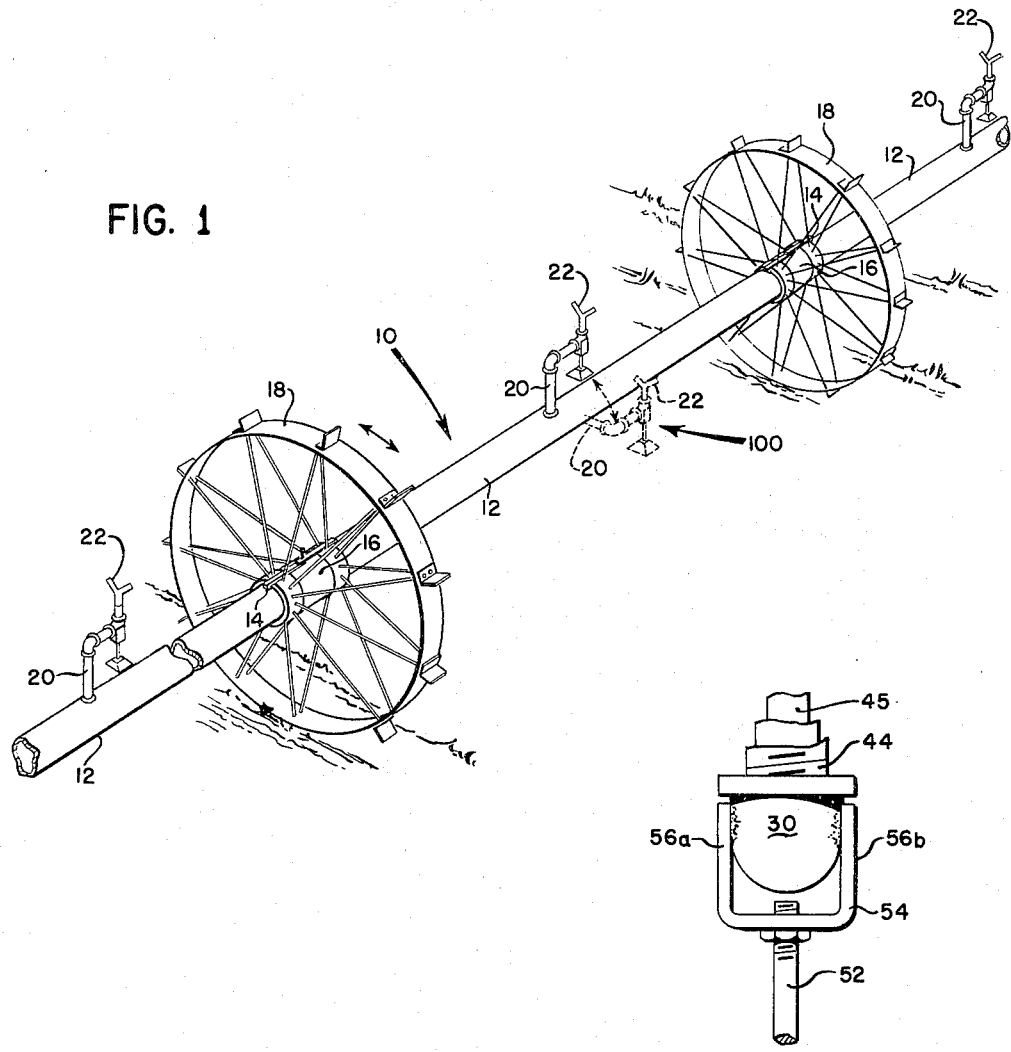

Oct. 3, 1961 W. J. JONES 3,002,697
MOVABLE FIELD SPRINKLER
Filed Feb. 29, 1960 2 Sheets-Sheet 1

*INVENTOR.*
WILLIAM J. JONES
BY
ATTORNEY

Oct. 3, 1961
W. J. JONES
3,002,697
MOVABLE FIELD SPRINKLER
Filed Feb. 29, 1960
2 Sheets-Sheet 2
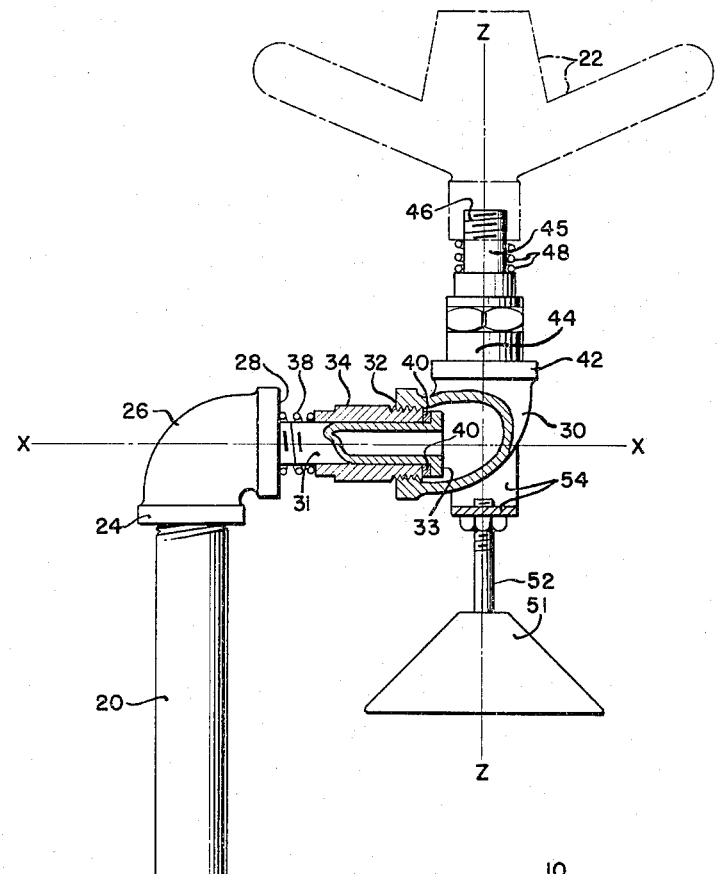
FIG. 2
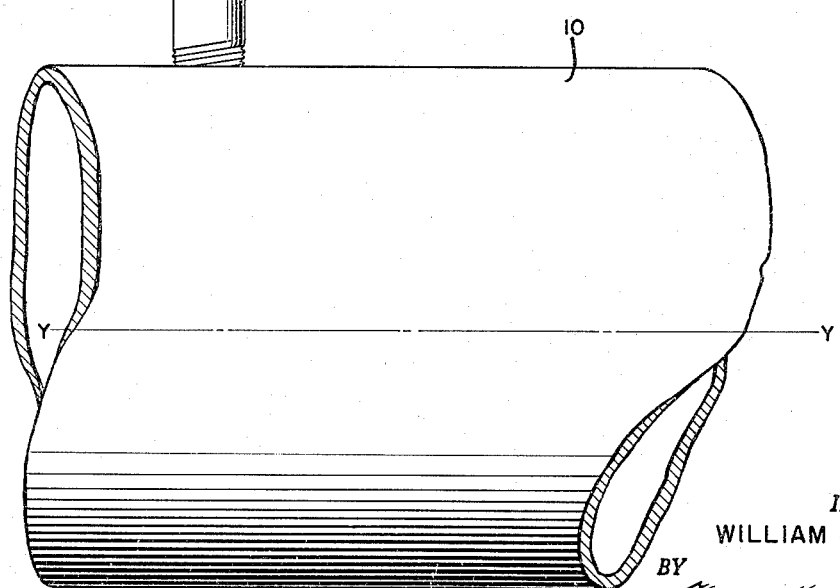
INVENTOR.
WILLIAM J. JONES
BY
ATTORNEY

United States Patent Office 3,002,697
Patented Oct. 3, 1961

3,002,697
MOVABLE FIELD SPRINKLER
William J. Jones, Palo Alto, Calif., assignor to Hiller Engineering Corporation, San Jose, Calif., a corporation of California
Filed Feb. 29, 1960, Ser. No. 11,607
3 Claims. (Cl. 239—212)

The present invention relates to mechanized sprinkler irrigation apparatus. More particularly the present invention relates to apparatus of the type wherein an elongated water supply pipe, known as a "lateral" line, is mounted upon a plurality of axially spaced wheels adapting it to be rolled across a field from one location of use to another and wherein rotary water distributing sprinkler heads are mounted upon short branch pipes known as "risers" extending radially from the lateral line.

When a sprinkler system of this type is rolled across a field to a new location, great care must be taken at the new location to make sure that all the risers project vertically from the header pipe so that the rotary sprinkler heads may opearte satisfactorily. This frequently requires considerable manipulation of the lateral pipe or certain sections thereof, because, due to the very considerable length of the lateral and the possibility of torsional displacement of portions of said pipe relative to each other as the assembly is rolled across the field, or due to unevenness of the ground upon which the wheels rest, the risers will usually no longer be aligned in a common radial plane upon arrival of the line at its new location, but may project in different directions angularly of the axis of the lateral line. As a result thereof, only some of the risers will be disposed vertically, while others will depart in varying degrees from the vertical.

It is an object of the invention to eliminate the cumbersome task of manipulating portions of the lateral pipe of a field sprinkler at a new location of use to set all the riser pipes thereof to a vertical position.

More particularly, it is an object of the invention to provide a movable field sprinkler, of the type referred to, wherein the sprinkler head supporting pipes will automatically set the sprinkler heads to their proper operating positions without need for orientation of said pipes.

An additional object of the invention is to provide means for mounting the sprinkler heads of irrigation apparatus of the type referred to, in such a manner that said sprinkler heads will automatically assume their proper working position irrespective of misalignment of some or all of the sprinkler head supporting risers when the apparatus is moved to a new location.

These and other objects of the present invention will be apparent from the following description of the accompanying drawings which illustrate a certain embodiment thereof and wherein FIGURE 1 is a fragmentary perspective of a movable sprinkler line wherein the sprinkler heads are mounted in accordance with the invention;

FIGURE 2 is a side elevation, partly in section, of the structure for mounting the sprinkler heads; and FIGURE 3 is a fragmentary side elevation of a component of the structure shown in FIGURE 2, viewed from a point to the right of FIGURE 2.

Having first reference to FIGURE 1, the numeral 10 designates an irrigation pipe line known as the "lateral" which is composed of a series of pipe sections 12 joined by suitable couplings 14. This lateral pipe line passes through and is secured to the hollow hubs 16 of a plurality of axially spaced wheels 18. At points intermediately of the wheels 18, branch or "riser" pipes 20 rise radially from the pipe sections 12 to supply water under pressure to rotary sprinkler heads 22 supported at the upper ends of said riser pipes.

In accordance with the invention, each sprinkler head 22 is supported on its respective riser 20 by means of two swivel joints in such a manner that the axis of rotation of the rotary sprinkler will always automatically adjust itself to vertical disposition irrespective of what radial position relative to the axis of the lateral line its riser may assume. Having reference to FIGURE 2, one end 24 of an elbow joint 26 is detachably secured to the upper end of each riser 20 by means such as screw threads, with the opposite end 28 of said elbow joint in such a position that its center axis X—X is parallel to the center axis Y—Y of the header line 10; and supported from said opposite end 28 for rotation about the axis X—X thereof is another elbow joint 30. For this purpose a short tubular stem 31 is secured to the end 28 of the first elbow joint by means such as screw theads, and extends into the adjacent end 32 of the second elbow joint 30 wherein it is provided with a head in the form of an external flange 33. Slidably arranged around the stem 31 is a tubular swivel member 34 provided with external threads at its end adjacent the end 32 of elbow joint 30, by means of which it may be firmly secured to said elbow joint end which is provided with internal threads for this purpose. Thus, the second elbow joint 30 and the tubular member 34 may swivel as a unit about the stationary swivel stem 31. A spring 38 may be interposed between the end 28 of the first elbow joint and the adjacent end edge of the tubular member 34 to urge the opposite end edge of said member into engagement with a hydraulic seal and friction washer 40 that is arranged about the swivel stem 31 adjacent the outwardly directed annular surface of its head 33 within the end 32 of elbow joint 30.

Secured to the opposite end 42 of the elbow joint 30 by means such as screw theads is another tubular member 44 which may be of the same construction as the hereinbefore described tubular member 34, and slidably received within said tubular member 44 is another tubular stem 45 that is of the same construction as the hereinbefore described swivel stem 31. Firmly secured to the upwardly extending end of said stem for rotation therewith, such as by means of screw threads shown at 46, is a sprinkler head 22 and a spring 48 arranged around said stem 45 and interposed between said sprinkler head and the upper end edge of the tubular member 44 holds the stem 45 in a vertical position wherein its head within the end 42 of the elbow joint 30 bears against a friction washer (not shown). The sprinkler head 22 is of conventional design.

Due to the swivel joint formed by the swivel stem 31 and the swivel member 34, the sprinkler head 22 is free to turn about the axis X—X of the elbow end 28 which is at all times parallel to the axis Y—Y of the pipe 10. To insure that the sprinkler head supporting tubular stem 45 remains in a vertical position above the axis X—X of swivel joint 31—34, a counterweight 51 is supported from the second elbow joint 30 below the level of the axis X—X as illustrated in FIGURE 2 wherein said counterweight is provided with an upwardly extending bolt 52 the free end of which is threadably engaged in the center bar 53 of a stirrup 54 (FIGURE 3) which embraces the second elbow joint and its side bars 56a and 56b firmly secured to said elbow joint. The counterweight 51 must be sufficiently heavier than the sprinkler head 22 and its mounting structure as formed by the tubular swivel stem 45, the swivel member 44 and the upturned end 42 of the elbow joint 30, to hold said mounting structure at all times in the vertically disposed position illustrated in FIGURE 2, and to set it into said position, notwithstanding the frictional load imposed by the spring 38, whenever the riser 20 departs from a vertical position, such as occurs when the pipe line 10 is rolled across the field to a new location. It will be understood that the riser 20 must be of sufficient length to hold the described structure at a distance radially removed from the surface of the pipe 10 wherein neither the sprinkler head nor the counterweight may come into contact with the top or bottom surface, respectively, of the pipe 10 as said pipe is rolled across the field on its wheels while the sprinkler head 22 and the counterweight 51 remain in the vertically aligned position illustrated at 100 in FIGURE 1.

Hence, by operatively supporting the rotary sprinkler head 22 from its riser 20 through a tubular swivel member 34 that is free to turn about a horizontal axis parallel to the axis of the header pipe and upon a tubular swivel stem 45 that is free to turn about a vertical axis and which forms in fact the rotary base member of the sprinkler head, water is freely supplied to the sprinkler head from the riser pipe, and the axis of rotation Z—Z of the sprinkler head remains always vertically disposed, and said head may therefore operate at peak efficiency no matter how much its riser pipe may depart from a vertical position. Hence, when the irrigation line is moved to a new location, it is always immediately ready for operation, and it is no longer necessary to undertake the cumbersome and time-consuming task of checking each sprinkler head and adjusting the position of its riser pipe precisely to vertical alignment.

While I have described my invention in a particular embodiment thereof, it will be understood that the invention is not limited to the specific constructional details shown and described by way of example, which may be varied without departing from the scope and spirit of the invention.

I claim:

1. An irrigation apparatus comprising a water supply pipe supported upon wheels for movement across an area to be irrigated; said wheels being fixed to said pipe for rotation therewith, a branch pipe projecting radially from said supply pipe, a sprinkler head, water-conducting means for supporting said sprinkler head from said branch pipe for rotation about an axis parallel to said supply pipe, and means for maintaining said sprinkler head in a vertical position relative to said axis of rotation irrespective of the position of said branch pipe angularly of the axis of said supply pipe.

2. An irrigation apparatus comprising a pipe line section supported upon a wheel for movement across an area to be irrigated; said wheel being fixed to said pipe line section for rotation therewith, a branch pipe projecting radially from said pipe section, a rotary sprinkler head rotatable about an axis at right angles to the axis of said pipe line section, and means for supporting said sprinkler head from said branch pipe for rotation about an axis parallel to the axis of said pipe line section.

3. An irrigation apparatus comprising a pipe line section supported upon a wheel for movement across an area to be irrigated; said wheel being fixed to said pipe line section for rotation therewith, a branch pipe projecting radially from said pipe line section, a rotary sprinkler head rotatable about an axis at right angles to the axis of said pipe line section, water-conducting means for supporting said sprinkler head from said branch pipe for rotation about an axis parallel to the axis of said pipe line section, and counterweight means for maintaining said sprinkler head vertically above said parallel axis of rotation irrespective of the position of said branch pipe angularly of the axis of said pipe line.

References Cited in the file of this patent

UNITED STATES PATENTS

| 494,847 | Creed | Apr. 4, 1893 |
| 1,468,538 | Mackey | Sept. 18, 1923 |
| 2,807,500 | Clayton | Sept. 24, 1957 |